United States Patent [19]

Wang

[11] 4,311,162
[45] Jan. 19, 1982

[54] INVERTED BUCKET STEAM TRAP

[75] Inventor: Ricky K. Wang, Blue Bell, Pa.

[73] Assignee: Yarway Corporation, Blue Bell, Pa.

[21] Appl. No.: 162,177

[22] Filed: Jun. 23, 1980

[51] Int. Cl.³ .............................................. F16T 1/26
[52] U.S. Cl. .................................... 137/185; 137/445
[58] Field of Search ...................... 137/185, 445, 192

[56] References Cited

U.S. PATENT DOCUMENTS 2,024,774 12/1935 Mastenbrook ...................... 137/185
3,283,774 11/1966 Johnson et al. ...................... 137/185

FOREIGN PATENT DOCUMENTS 548091 9/1942 United Kingdom ................ 137/185

Primary Examiner—Alan Cohan
Attorney, Agent, or Firm—John W. Logan, Jr.

[57] ABSTRACT

An inverted bucket steam trap having a two lever (30, 34) linkage mechanism between the bucket (18) and the valve member (28) which engages a valve seat (26) through which condensate is discharged. The first lever is connected to the bucket and the second lever carries the valve member. The linkage mechanism is arranged such that the second lever initially undergoes pivotal movement to disengage the valve member from the valve seat and then translatory movement to the fully open position of the valve.

19 Claims, 8 Drawing Figures

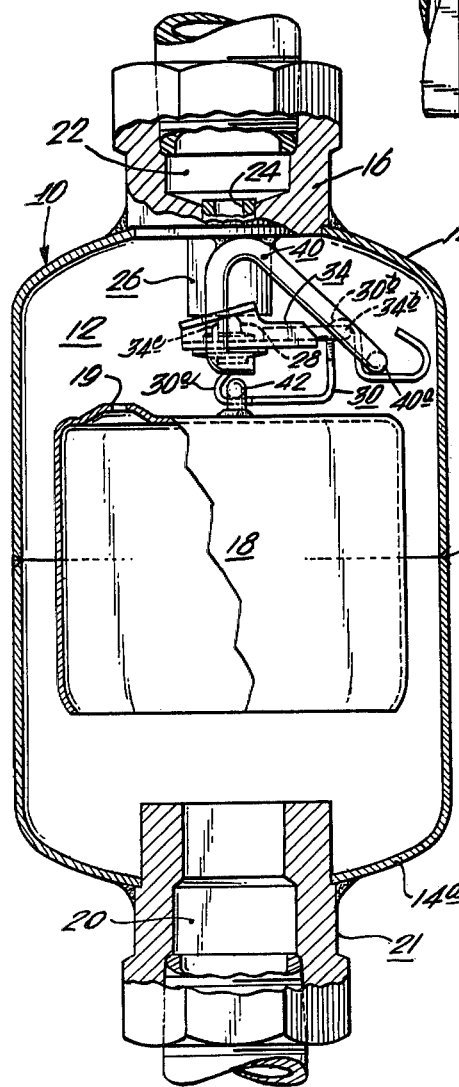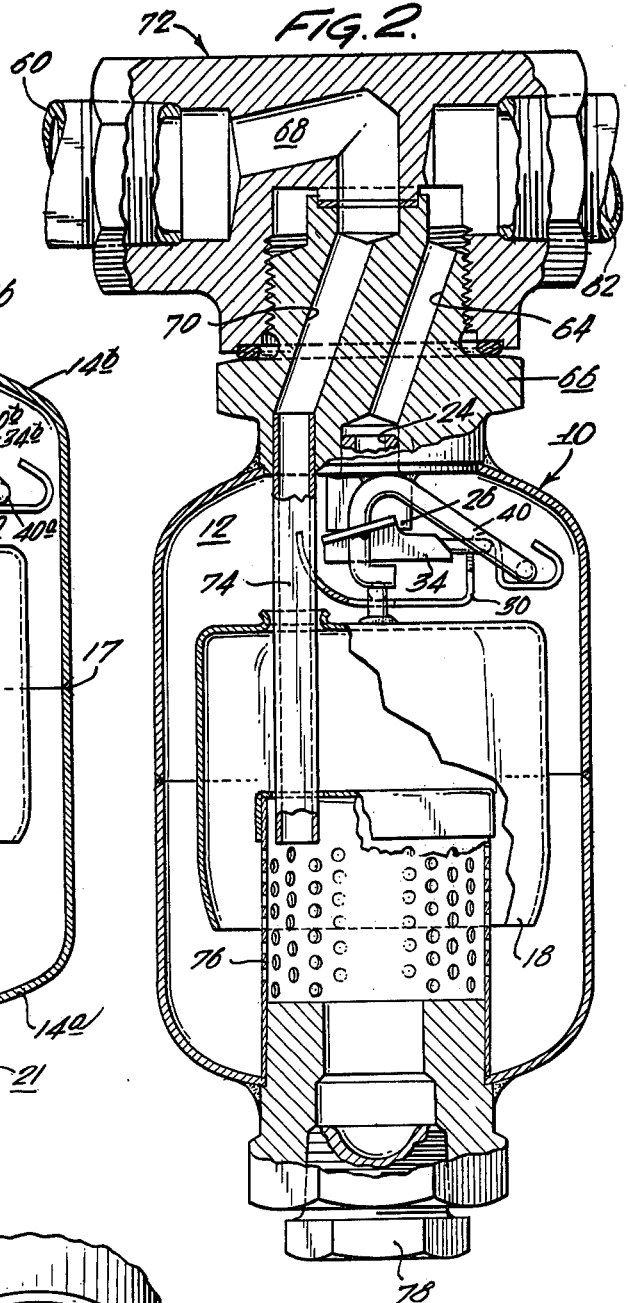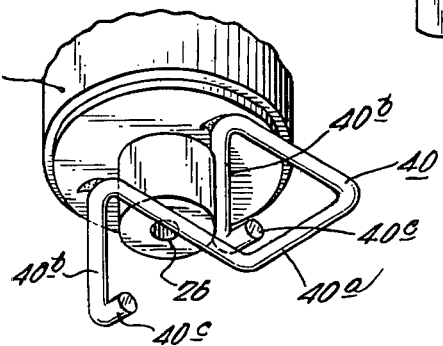

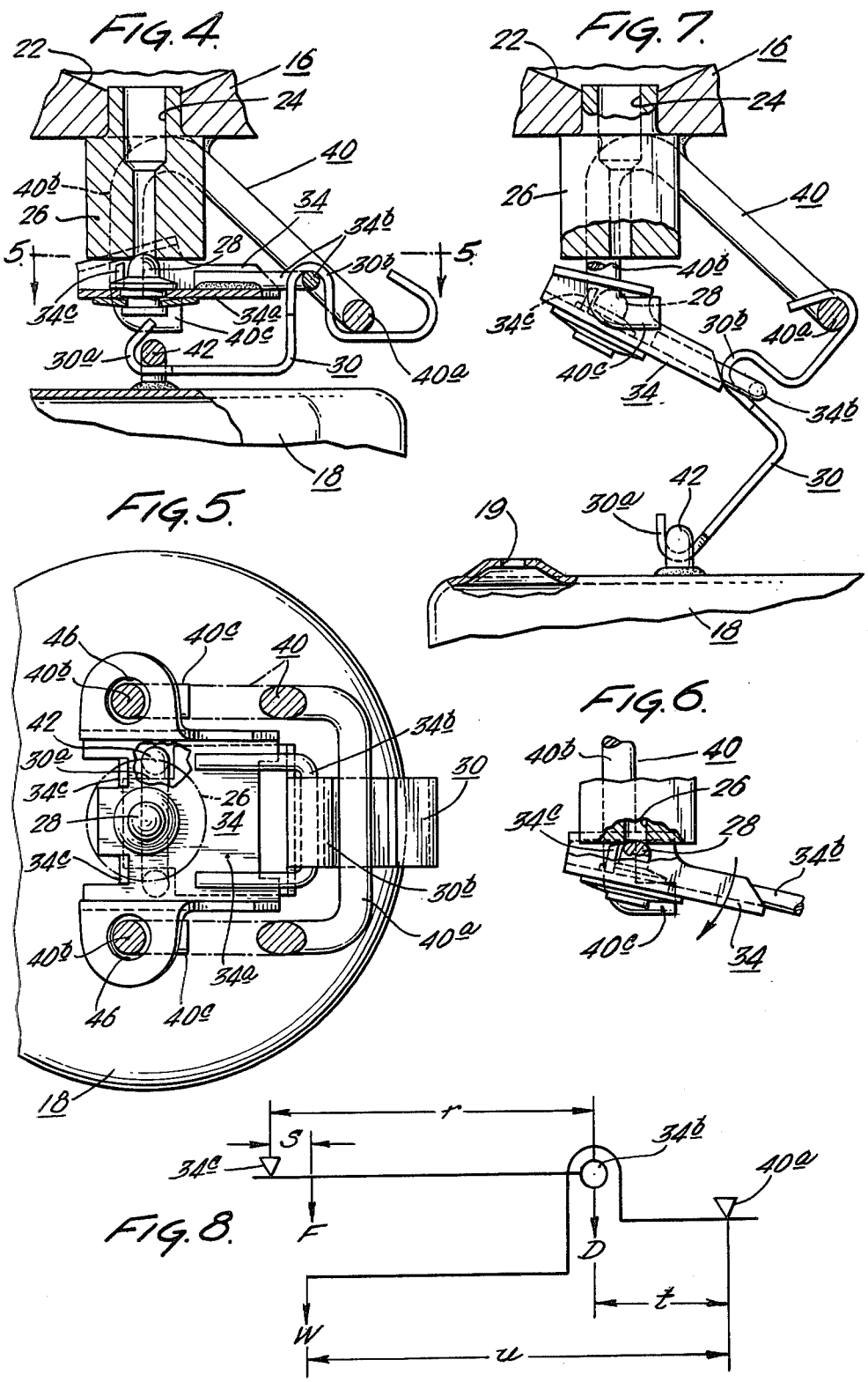

INVERTED BUCKET STEAM TRAP

DESCRIPTION

1. Technical Field

The present invention relates, in general, to steam systems and, in particular, to an inverted bucket steam trap used to remove condensate from a steam line.

2. Background Art

In the use of steam for various heating and power purposes, it is desirable to drain off condensate which forms along the inner surfaces of the pipes through which the steam is delivered. If the condensate is allowed to collect, it will eventually fill up the steam space and prevent hot steam from reaching those portions of the steam system where it is to be put to use.

A steam trap is used to drain condensate from a steam system. A steam trap is simply a device that removes condensate from the system but retains steam in the system. One common steam trap is the inverted bucket steam trap. Such a unit is tapped into the steam system in such a way that condensate collects in the trap. So long as hot steam is present at the trap, an inverted bucket within the trap assumes a particular position such that a valve coupled to the bucket remains closed. However, when sufficient condensate from the steam system collects in the trap, the inverted bucket moves to open the valve to permit drainage of the condensate from the trap.

Although the inverted bucket steam trap is old in the art and many different forms of such a device have been used extensively in the past, generally the prior inverted bucket steam traps fail to satisfy the concurrent requirements of compactness, efficient design and reasonable cost.

DISCLOSURE OF THE INVENTION

Accordingly, it is an object of the present invention to provide a new and improved inverted bucket steam trap.

It is another object of the present invention to provide an inverted bucket steam trap which is relatively small in size, capable of being manufactured at a reasonable cost, and effective in removing condensate from a steam system.

An inverted bucket steam trap constructed in accordance with the present invention comprises a body having a float chamber and an inverted bucket movable within the float chamber. Also included are supply means in fluid communication with the interior of the bucket for supplying steam to the bucket causing the bucket to float and for supplying condensate to the float chamber causing the bucket to sink. The steam trap further includes discharge means in fluid communication with the float chamber through a valve seat for discharging condensate from the fluid chamber and a valve member movable into and out of engagement with the valve seat. Coupling means are provided between the valve member and the bucket for moving the valve member in response to movements of the bucket. The coupling means include a first lever which is connected to the bucket and mounted for pivotal movement about a first axis and a second lever which carries the valve member and is mounted for pivotal movement about a second axis and for translatory movement away from the second axis. The first and second levers are coupled together at a point which moves about the first and second axes. This construction provides a high leverage ratio in a limited space to open the valve and further allows the valve member to drop to a fully open position as soon as pressure is equalized across the valve member.

BRIEF DESCRIPTION OF DRAWINGS

Referring to the drawings:

FIG. 1 is a sectional view of a first embodiment of an inverted bucket steam trap constructed in accordance with the present invention;

FIG. 2 is a sectional view of a second embodiment of an inverted bucket steam trap constructed in accordance with the present invention;

FIG. 3 is a perspective view of a portion of the FIGS. 1 and 2 traps;

FIG. 4 is an enlarged showing of a portion of the inverted bucket steam trap shown in FIG. 1;

FIG. 5 is a sectional view taken along line 5—5 of FIG. 4;

FIGS. 6 and 7 are sectional views illustrating the movements of various components of the FIG. 1 inverted bucket steam trap; and FIG. 8 is a schematic representation of the linkage mechanism of the FIGS. 1 and 2 traps.

BEST MODES OF CARRYING OUT THE INVENTION

Referring to FIG. 1, an inverted bucket steam trap, constructed in accordance with the present invention, includes a body 10 having a float chamber 12. Body 10 is generally cylindrical and includes shell portions 14a and 14b which define float chamber 12 and an upper portion 16, in the form of a fitting, which is secured to shell portion 14b by suitable means, such as welding. After assembly and installation of the components within body 10, shell portions 14a and 14b are secured together by suitable means, such as welding along a seam 17.

The inverted bucket steam trap of the invention also includes an inverted bucket 18 movable within float chamber 12. As shown in FIG. 1, bucket 18 is arranged to move along the longitudinal axis of body 10. A small opening 19 is provided in the top wall of bucket 18 to permit steam to escape at a slow controlled rate in the usual manner.

Also included in the inverted bucket steam trap shown in FIG. 1 are supply means in fluid communication with the interior of bucket 18 for supplying steam to the bucket to cause the bucket to float and for supplying condensate to the float chamber to cause the bucket to sink. The supply means may include an inlet 20 extending through an inlet fitting 21, located below float chamber 12 and secured to lower shell portion 14a by suitable means, such as welding. Inlet 20 opens into the float chamber to deliver steam or condensate, as the case may be, to the float chamber. As steam is introduced through inlet 20, it collects within bucket 18 to cause the bucket to float. As condensate enters the float chamber through inlet 20, the liquid collects within and outside bucket 18 causing the bucket to sink.

The FIG. 1 inverted bucket steam trap further includes discharge means in fluid communication with float chamber 12 for discharging condensate from the float chamber. The discharge means may include an outlet 22 extending through fitting 16 and located above float chamber 12. Outlet 22 is in fluid communication with float chamber 12 through a passage 24 in a valve seat 26. For the embodiment in FIG. 1, inlet 20 at the bottom of body 10 and outlet 22 at the top of body 10 are aligned along the longitudinal axis of the body.

Also included in an inverted bucket steam trap constructed in accordance with the present invention is a valve member 28 movable into and out of engagement with valve seat 26. As will be explained shortly, valve member 28 moves in response to movements of bucket 18. When bucket 18 floats, in response to the introduction of steam through inlet 20, valve member 28 is in seated engagement with valve seat 26. When bucket 18 sinks, in response to the introduction of condensate through inlet 20, valve member 28 is drawn away from valve seat 26.

Referring to FIGS. 1, 3, 4, 5, 6 and 7, movements of valve member 28, in response to movements of bucket 18, are produced by coupling means between the valve member and the bucket. The coupling means include a first lever 30 connected to bucket 18 and mounted for pivotal movement about a first axis and a second lever 34 carrying valve member 28 and mounted for pivotal movement about a second axis and for translatory movement away from the second axis. As shown most clearly in FIG. 3, a bracket 40 is secured to the underside of fitting 16. This bracket defines the axis about which lever 30 pivots. In particular, lever 30 is attached at a first end to bucket 18 by means of a hook 30a at this end of the lever extending around a bracket 42 which is secured to the bucket. The second end of lever 30 pivots about a horizontal section 40a of bracket 40 which defines the first pivot axis.

FIG. 5 shows lever 34. This component has two parts. A first solid portion 34a has two holes 46 arranged to permit pivotal movement and sliding translatory movement along vertical legs 40b of bracket 40. Legs 40b define a third axis which extends parallel to the longitudinal axis of body 10. Thus, lever 34 pivots relative to legs 40b of bracket 40 and slides along these legs of the bracket to move valve 28 into and out of engagement with valve seat 26. The second part of lever 34 is a bracket 34b secured to part 34a and arranged to engage a U-shaped portion 30b of lever 30. Lever 34 has a pair of upwardly bent tabs 34c adapted to engage the underside of valve seat 26 between vertical legs 40b of bracket 40, thereby defining the axis about which lever 34 pivots. A slight clearance is provided between the tops of tabs 34c and the underside of valve seat 26 to permit manufacturing tolerance. Valve member 28 is secured to lever 34 in close proximity to tabs 34c.

FIG. 4 shows the condition under which valve member 28 is seated in valve seat 26, whereby steam in the trap is prevented from being discharged. As float chamber 12 fills with condensate, bucket 18 sinks causing lever 30 to pivot counterclockwise about horizontal section 40a of bracket 40. This movement causes bracket 34b of lever 34 to move downward causing lever 34 to pivot clockwise about the point at which tabs 34c engage the underside of valve seat 26 and, thereby move valve member 28 out of engagement with valve seat 26. This action is shown in FIG. 6. After the pressure equalizes above and below valve member 28, additional movement of bracket 34b causes lever 34 to slide downward quickly along vertical legs 40b of bracket 40 and move the valve member to the full open position shown in FIG. 7, thereby opening passage 24. Bent sections 40c of bracket 40 stop the downward, sliding movement of lever 34. The downward travel of lever 34 is set to be at least one-quarter of the diameter of passage 24. The opening of passage 24 permits the discharge of condensate from float chamber 12.

Upon the introduction of steam through inlet 20, bucket 18 floats causing lever 30 to pivot clockwise about horizontal section 40a of bracket 40. This permits bracket 34b of lever 34 to move upward toward the position shown in FIGS. 1 and 4. Steam entering bucket 18 escapes slowly through opening 19 in the top wall of the bucket and causes valve member 28 to move toward valve seat 26 causing lever 34 to pivot counterclockwise, whereby valve member 28 engages valve seat 26 to close fluid passage 24. This condition prevents steam from being discharged through fluid passage 24 and outlet 22. With valve member 28 in engagement with valve seat 26, levers 30 and 34 are generally horizontal.

FIG. 2 shows a second embodiment of an inverted bucket steam trap constructed in accordance with the present invention. The operation of this embodiment is generally similar to the operation of the FIG. 1 embodiment. Therefore, a detailed description of the construction and operation of the FIG. 2 embodiment will be omitted.

The supply means for introducing steam or condensate and the discharge means for discharging condensate include an inlet 60 and an outlet 62, respectively, which are aligned along an axis perpendicular to the longitudinal axis of body 10 of the trap. As seen in FIG. 2, inlet 60 and outlet 62 are located above float chamber 12.

Float chamber 12 is connected to outlet 62 through a first fluid flow passage comprising passage 24 in valve seat 26 and passage 64 in an adapter 66. A second fluid flow passage comprising passages 68 and 70 in a fitting 72 and adapter 66, respectively, and a tube 74 connect inlet 60 and float chamber 12. Specifically, tube 74 extends from adapter 66 above bucket 18 through the top wall of the bucket into the interior of the bucket. Steam or condensate, as the case may be, introduced through inlet 60 is delivered to the interior of a cylindrical screen 76 positioned within float chamber 12 and extending into the interior of bucket 18.

Steam introduced through inlet 60 will cause bucket 18 to float, whereby a valve member (not shown but carried by lever 34) is in engagement with valve seat 26. Condensate introduced through inlet 60 will cause bucket 18 to sink, whereby the valve member is removed from engagement with valve seat 26 to permit condensate to be discharged from the trap. Although certain of the components in the coupling means between bucket 18 and the valve member in the FIG. 2 embodiment have different configurations from similar components in the FIG. 1 embodiment, the movements of the valve member, in response to movements of bucket 18, in the FIG. 2 embodiment of the invention, are similar to those of the FIG. 1 embodiment.

Screen 76 serves to filter dirt or residue from the condensate. A plug 78 serves to provide access to screen 76 to remove such dirt or residue.

FIG. 8 is a schematic representation of the linkage mechanism between bucket 18 and valve member 28. This figure will aid in understanding the advantages derived from an inverted bucket steam trap constructed in accordance with the present invention.

Force W represents the weight of bucket 18. Upon downward movement of bucket 18, the counterclockwise pivotal movement about horizontal section 40a of bracket 40 is defined by the following equation:

$$(W)(u) = (D)(t) \quad (1)$$

Where:
W represents the weight of bucket 18
D represents the force on bracket 34b
u represents the lever arm of bucket 18
t represents the lever arm of bracket 34b Upon downward movement of bracket 34b, the clockwise pivotal movement of lever 34 about the point at which tabs 34c bear against valve seat 26 is defined by the following equation:

$$(D)(r) = (F)(s) \quad (2)$$

Where:
D represents the force on bracket 34b
F represents the force to move valve member 28 away from valve seat 26
r represents the lever arm of bracket 34b
s represents the lever arm of valve member 28

Solving for D in Equations (1) and (2) and equating the two, the equation for the overall linkage system is:

$$F = (W)(u/t)(r/s) \quad (3)$$

It is seen from Equation (3) that the two-lever system of the present invention provides an effective magnification of the weight of bucket 18. This permits using a smaller bucket for a given flow capacity which, in turn, permits smaller overall dimensions for the steam trap or for a given size steam trap, the flow capability may be increased.

While in the foregoing there have been described two preferred embodiments of the invention, it should be understood to those skilled in the art that various modifications and changes can be made without departing from the true spirit and scope of the invention as recited in the claims.

I claim:

1. An inverted bucket steam trap comprising:
a body having a float chamber;
an inverted bucket movable within said float chamber;
supply means in fluid communication with the interior of said bucket for supplying steam to said bucket causing said bucket to float and for supplying condensate to said float chamber causing said bucket to sink;
discharge means in fluid communication with said float chamber through a valve seat for discharging condensate from said float chamber;
a valve member movable into and out of engagement with said valve seat;
and coupling means between said valve member and said bucket for moving said valve member in response to movements of said bucket, said coupling means including a first lever connected to said bucket and mounted for pivotal movement about a first axis and a second lever carrying said valve member and mounted for pivotal movement about a second axis and for translatory movement away from said second axis along a predetermined third axis, said first and second levers coupled together at a point which moves about said first and second axes.

2. An inverted bucket steam trap according to claim 1, wherein said body is generally cylindrical and said inverted bucket is movable along the longitudinal axis of said body.

3. An inverted bucket steam trap according to claim 2 wherein said valve member is in engagement with said valve seat when said first and second levers are generally horizontal.

4. An inverted bucket steam trap according to claim 1 wherein said coupling means also include a bracket secured to said body and defining said first axis and said second lever engages said valve seat to define said second axis.

5. An inverted bucket steam trap according to claim 4 wherein said body is generally cylindrical and said inverted bucket is movable along the longitudinal axis of said body.

6. An inverted bucket steam trap according to claim 4 wherein said bracket also defines said third axis for said translatory movement.

7. An inverted bucket steam strap according to claim 6 wherein said first lever is attached at a first end thereof to said inverted bucket and the second end thereof pivots about a first portion of said bracket, a first end of said second lever slides along a second portion of said bracket defining said third axis, and the second end of said second lever is coupled to said first lever, and said valve member is secured to said second lever at a point in close proximity to said first end of said second lever.

8. An inverted bucket steam trap according to claim 2 wherein said supply means include an inlet to said body, said discharge means include an outlet from said body, and said inlet and outlet are aligned along said longitudinal axis of said body.

9. An inverted bucket steam trap according to claim 2 wherein said supply means include an inlet to said body, said discharge means include an outlet from said body, and said inlet and outlet are aligned along an axis perpendicular to said longitudinal axis of said body.

10. An inverted bucket steam trap according to claim 9 wherein said inlet and outlet are located above said float chamber.

11. An inverted bucket steam trap according to claim 8 wherein said inlet is below said float chamber and said outlet is above said float chamber.

12. An inverted bucket steam trap according to claim 2 wherein said supply means include an inlet to said body and said discharge means include an outlet from said body.

13. An inverted bucket steam trap according to claim 2 wherein said body includes a lower shell portion defining said float chamber and an upper portion having a first fluid flow passage connecting said float chamber and said outlet.

14. An inverted bucket steam trap according to claim 13 wherein said inlet opens into said float chamber.

15. An inverted bucket steam trap according to claim 13 wherein said upper portion has a second fluid flow passage connecting said float chamber and said inlet.

16. An inverted bucket steam trap according to claim 15 wherein said second fluid flow passage includes a tube extending from said upper portion through the top wall of said bucket into the interior of said bucket.

17. An inverted bucket steam trap according to claim 7 wherein said first portion of said bracket extends transverse to said longitudinal axis of said body and said second portion of said bracket extends parallel to said longitudinal axis.

18. An inverted bucket steam trap according to claim 17 wherein said second portion of said bracket includes two vertical legs and said second lever has two openings through which said legs extend.

19. An inverted bucket steam trap according to claim 18 wherein said second lever includes a pair of tabs at said first end of said second lever which engage said valve seat to define said second axis.

* * * * *